Figure 1:
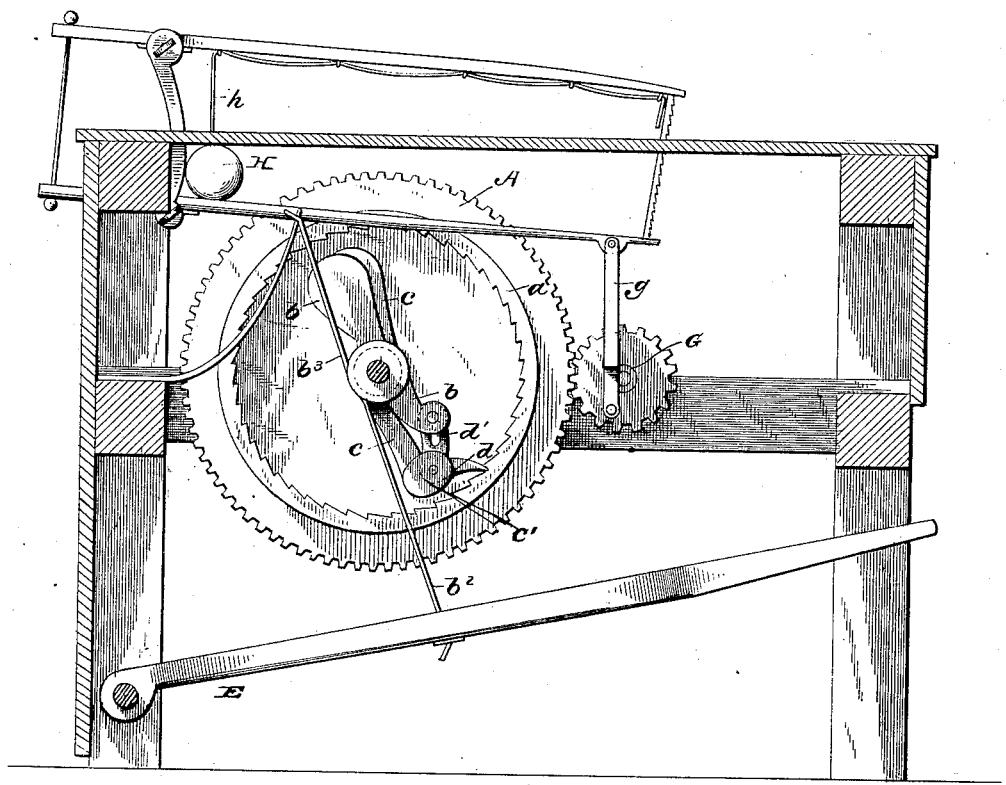

(No Model.)

J. E. & J. W. ADAMS.
MECHANICAL MOVEMENT.

No. 341,438. Patented May 11, 1886.

WITNESSES
W. W. Mortimer
H. C. Bryan

INVENTORS:
Jas. E. Adams,
Jno. W. Adams,
By R. S. Dyrenforth,
their Attorney

UNITED STATES PATENT OFFICE.

JAMES E. ADAMS AND JOHN W. ADAMS, OF GLASSBOROUGH, NEW JERSEY, ASSIGNORS, BY MESNE ASSIGNMENTS, TO THE NEW GIANT POWER COMPANY.

MECHANICAL MOVEMENT.

SPECIFICATION forming part of Letters Patent No. 341,438, dated May 11, 1886.

Application filed November 4, 1885. Serial No. 181,860. (No model.)

*To all whom it may concern:*

Be it known that we, JAMES E. ADAMS and JOHN W. ADAMS, citizens of the United States, residing at Glassborough, in the county of Gloucester and State of New Jersey, have invented certain new and useful Improvements in Mechanical Movements; and we do hereby declare the following to be a full, clear, and exact description of the invention, such as will enable others skilled in the art to which it appertains to make and use the same.

This invention relates to mechanical movements.

The object of our invention is to produce a mechanical movement, whereby great power can be exerted with comparatively small expenditure of force, which shall be of compact and simple construction, positive and reliable in operation, and convenient and effective in use.

The invention is embodied in a device consisting, essentially, in a main driving-wheel provided with a series of teeth, projections, or indentations, and a pawl or pawls pivoted upon a movable arm or arms mounted contiguous to the wheel, the said pawl or pawls being so arranged as to be moved automatically into contact with the wheel to give it an impetus, and away from it to allow the pawl or pawls to be returned to a normal position, as the power is applied or relieved.

Furthermore, the invention consists in a device comprising a main driving-wheel provided with a series of teeth, projections, or indentations, and a pawl or pawls pivoted upon a movable arm or arms mounted contiguous to the wheel, and an arm or arms mounted upon a sleeve or sleeves, also contiguous to the wheel, the sleeve or sleeves being provided with an operating-strap, and the last arm or arms being attached to the pawl or pawls in such manner that a forward movement of the sleeve or sleeves will move the pawl or pawls into contact with the teeth, projections, or indentations of the wheel, and at the cessation of motion of the sleeve or sleeves will move the pawl or pawls back to the normal position.

Furthermore, the invention consists in a device embracing a main driving-wheel provided with a series of teeth, projections, or indentations, a pawl or pawls mounted on a movable arm or arms arranged contiguous to the driving-wheel, and another arm or other arms projecting from a sleeve mounted near the driving-wheel and provided with operating strap or straps, the latter arm or arms being provided with a pin or with pins resting in a slot in the pawl or pawls, so that when the sleeve is rotated the pawl or pawls will be caused to engage with the teeth, projections, or indentations on the wheel and impart motion to the wheel; and, finally, the invention consists in the combination, with the agroupment just mentioned, of a treadle for imparting motion to the sleeves, and means for returning the sleeve and pawl or pawls to their respective normal positions after being operated to impart motion to the driving-wheel.

In the accompanying drawings, forming a part of our specification, like letters of reference designate corresponding parts.

Figure 2:
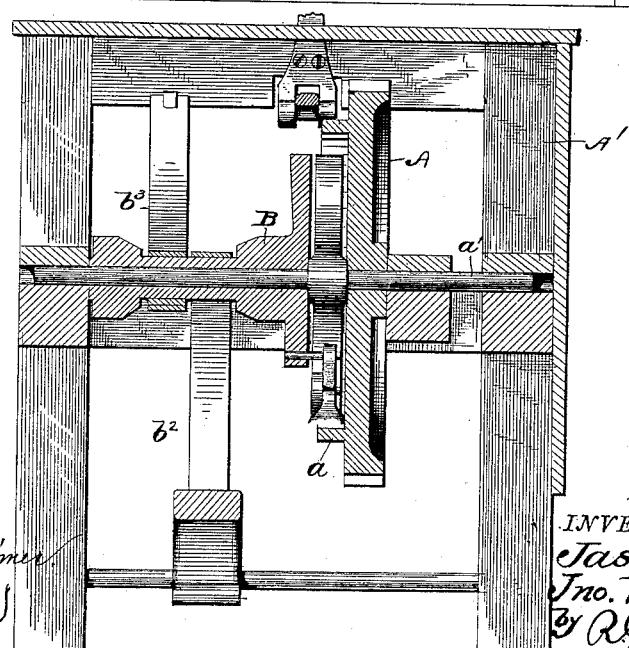

Figure 1 is a side elevation of our invention, the supporting-frame being partly broken away to disclose the disposition of operative parts, and Fig. 2 is a vertical sectional view, the section being taken in a direction coincident with the shaft upon which the driving-wheel is mounted.

The device now to be described may be applied to operate any small machinery—such as sewing-machines, churns, jig-saws, fans, or the like—in which the desideratum is to attain considerable speed and power with a small expense of force. In the present embodiment of the invention it is shown as applied to a jig-saw.

In the drawings, A represents the large motor-wheel, which has upon one of its faces a series of teeth or projections, *a*. The wheel is mounted upon a shaft, *a'*, having bearings in the frame A'.

*c* represents an arm mounted loosely upon the shaft *a'*, so as to have a motion independent thereof. The upper end of this arm is preferably weighted, and its lower end has a bifurcated head, *c'*, in which is pivoted a pawl consisting of two arms, *d* and *d'*, extending approximately at right angles to each other. The arm *d* is designed to engage the motor-wheel and turn the same, and with this object in view it is made slightly pointed in order to insure engagement with the teeth of the rack. Upon the shaft $a'$, near the arm $c$, is a sleeve, B, mounted loosely upon the shaft $a'$, which is provided at its end adjacent to the arm $c$ with an arm, $b$. The lower end of this arm has projecting therefrom a pin, which engages a slot in the arm $d'$ of the pawl. Thus it will be seen that when a rotary motion in the proper direction is given the sleeve the pin on the arm $b$ moves up in the slot in the upper end of the pawl, thus throwing the lower end outward, bringing it into contact with the teeth on the wheel, and that a continuation of this motion will revolve the wheel. A motion in the opposite direction will cause the lower end of the arm $d$ to descend in the slot in pawl, thus instantly moving the pawl out of contact with the wheel.

Any suitable means for imparting a rotary motion to the sleeve may be employed. In the present embodiment of the invention a treadle, E, and strap $b^2$ are shown as a means of accomplishing this. The treadle is mounted at its rear end in the frame, and its front end is adapted to receive pressure from the foot. The strap is attached at one end to the treadle, and at the other end it is attached to the sleeve and wound upon the same in a direction opposite to that in which it is desired to turn the driving-wheel. After the impetus has been given the wheel by forcing the treadle to the extent of its downward movement, the treadle is released and the sleeve returns to its normal position. This return may be effected by a spring, which is coiled when the sleeve is rotated in a direction to move the wheel, and the resiliency of this spring will return the sleeve to a proper position to receive another impetus from the treadle; or, if desired, the arrangement shown may be employed. This consists of a leaf-spring, F, attached to any suitable part of the frame, and a strap, $b^3$, wound upon the sleeve in a direction opposite to that in which the strap $b^2$ is wound. As the strap $b^2$ is unwound in driving the sleeve, the strap $b^3$ is wound upon the sleeve against the force of the spring F, and as soon as pressure is removed from the treadle the resiliency of the spring, acting upon the sleeve through the strap $b^3$, will turn the sleeve back to its normal position. The wheel A is preferably comparatively quite heavy and gears with a much smaller and lighter wheel, so that the momentum imparted to the said wheel A is not overcome between the impulses of the pawl, but, on the contrary, a continuous rotary motion of the drive-wheel is produced by the operation of the device.

The motion of the wheel may be converted into any desired motion, and in the present instance I have shown it used for operating what is termed a "scroll" or "jig" saw. For this purpose the wheel A may have its perimeter provided with teeth, which may be made to mesh with the teeth of a pinion, G, carrying a rod, $g$, which will be reciprocated by the rotation of said pinion. The rod $g$ is pivoted to the lower arm of the saw-frame, which is mounted in the frame A' in a suitable manner.

A hollow ball, H, provided with a tube leading to the place where the saw is, operates to blow away the dust. The hollow ball H is located between the table and the lower arm of the saw-frame in such position that the oscillation will compress the ball to produce the necessary current of air.

Having thus fully described our invention, what we claim as new, and desire to secure by Letters Patent, is—

1. The herein-described mechanical movement, consisting in a main driving-wheel provided with a series of teeth, projections, or indentations, and a pawl or pawls pivoted upon a movable arm or arms mounted contiguous to the wheel, said pawl or pawls moving automatically into and out of contact with the teeth, projections, or indentations, as power is applied or discontinued.

2. The herein-described mechanical movement, consisting in a main driving-wheel provided with an internal series of teeth, projections, or indentations, an arm or arms loosely mounted near the wheel, a pawl or pawls pivoted to the arm or arms, provided with a slot or slots, and another arm mounted contiguous to the first, and provided with a pin entering the slot in the pawl, substantially as described.

3. The herein-described mechanical movement, consisting of a main driving-wheel provided with a series of teeth, projections, or indentations, an arm or arms mounted loosely upon the shaft of the wheel, provided with a pawl or pawls having a slot, a sleeve also mounted loosely upon the shaft provided with a driving-belt, and with an arm or arms provided with a pin entering the slot in the pawl, substantially as described.

4. The herein-described mechanical movement, consisting of the wheel A, provided with a circular ratchet, the sleeve having the operating-straps wound thereon in opposite directions, and the arms, one mounted loosely upon the main shaft and the other fast with the sleeve, and the pivoted pawl secured to the arm which is mounted upon the shaft and provided with a slot entered by a pin upon the arm fast upon the sleeve.

5. The herein-described mechanical movement, consisting of the wheel A, provided with a circular ratchet, the sleeve having the operating-straps wound thereon in opposite directions, one of said straps being connected with the operating-treadle and the other with the spring, and the arms, one mounted loosely upon the main shaft and the other fast with the sleeve, and the pivoted pawl secured to the arm which is mounted upon the shaft, and is provided with an inclined slot entered by a pin upon the arm fast upon the sleeve.

6. In combination with the drive-wheel A, the shaft on which said wheel is mounted, the sleeve mounted loosely upon the shaft and having formed therewith the arm $b$, provided at its lower end with a pin, the arm $c$, mounted loosely upon the shaft and provided with a bifurcated lower end, and a right-angular pawl mounted in the bifurcated end of the arm $c$, one end of said pawl engaging with the ratchet on the wheel A, and the other provided with an inclined slot entered by the pin on the arm $b$, substantially as described.

In testimony whereof we affix our signatures in presence of two witnesses.

JAMES E. ADAMS.
JOHN W. ADAMS.

Witnesses:
TAYLOR HOFFMAN,
WILLIAM SLOAN.